United States Patent
Lee

(10) Patent No.: US 7,242,023 B2
(45) Date of Patent: Jul. 10, 2007

(54) LIQUID CRYSTAL DISPLAY WITH LIGHT TRANSMISSION ADJUSTING LAYER AND MANUFACTURING METHOD OF THE SAME

(75) Inventor: Joun Ho Lee, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 63 days.

(21) Appl. No.: 09/891,533

(22) Filed: Jun. 27, 2001

(65) Prior Publication Data

US 2002/0080300 A1    Jun. 27, 2002

(30) Foreign Application Priority Data

Dec. 23, 2000    (KR) ................... 10-2000-81174

(51) Int. Cl.
*H01L 21/00* (2006.01)
(52) U.S. Cl. ............... 257/72; 257/59; 349/61
(58) Field of Classification Search ......... 349/43, 349/44, 59, 110, 61; 257/72, 59, 110
See application file for complete search history.

(56) References Cited

U.S. PATENT DOCUMENTS

| | | | | |
|---|---|---|---|---|
| 5,747,830 A | * | 5/1998 | Okita | 257/72 |
| 5,847,781 A | * | 12/1998 | Ono et al. | 349/44 |
| 6,593,990 B1 | * | 7/2003 | Yamazaki | 349/138 |
| 6,608,658 B1 | * | 8/2003 | Tsujimura et al. | 349/110 |
| 2002/0080300 A1 | * | 6/2002 | Lee | 349/61 |

FOREIGN PATENT DOCUMENTS

| | | | |
|---|---|---|---|
| JP | 10104620 A | * | 4/1998 |
| JP | 2000067765 A | * | 3/2000 |

\* cited by examiner

*Primary Examiner*—Laura M. Schillinger
(74) *Attorney, Agent, or Firm*—McKenna Long & Aldridge LLP

(57) ABSTRACT

A liquid crystal display includes a plurality of gate lines (GØ–Gn), a plurality of data lines (D1–Dn) formed in a direction crossing the gate lines, a plurality of pixel electrodes formed in a pixel area defined by the gate lines and the data lines, the pixel electrodes indicating pictures by a control of the corresponding gate lines, and a light volume adjusting layer formed on a lower layer of the pixel electrodes controlled by a second one of the gate lines (G1). A method for manufacturing a liquid crystal display includes the steps of: forming gate lines and a gate electrode on a substrate, forming a gate insulating film on the board including the gate electrode, forming a first active layer on the gate insulating film corresponding to an upper portion of the gate electrode and forming a second active layer on the gate insulating film corresponding to a portion where pixel electrodes are formed, forming source/drain electrodes on an upper portion of the first active layer, and forming a passivation film on the whole surface of the active layer including the source/drain electrodes.

6 Claims, 4 Drawing Sheets

LIQUID CRYSTAL DISPLAY WITH LIGHT TRANSMISSION ADJUSTING LAYER AND MANUFACTURING METHOD OF THE SAME

CROSS REFERENCES TO RELATED APPLICATIONS

This application claims benefit of Korean Patent Application No. P2000-81174, filed on 23 Dec. 2000, the entirety of which is hereby incorporated by reference for all purposes as if fully set forth herein.

BACKGROUND OF THE INVENTION

1. Field of the Invention

The present invention relates to a display device, and more particularly, to a liquid crystal display and a manufacturing method of the same.

2. Description of the Related Art

There are various pixel design methods for a TFT-LCD (Thin Film Transistor-Liquid Crystal Display). A designer must select between an amorphous-silicon TFT (a-Si:H TFT) and a Polycrystalline silicon TFT, and then, must select either a Back Channel Etched (BCE) TFT structure, a Channel Passivated (CHP) TFT structure and other TFT structures. After that, the designer must map out a TFT arrangement plan and a design of a pixel electrode and determine a storage capacitance (hereinafter, called Cst) type.

The Cst type is classified into a storage-on-common method and a storage-on-gate method according to methods for manufacturing a common electrode. In the storage-on-common method, the common electrode of the Cst is made separately, but in the storage-on-gate method, a portion of a gate wiring of a front end is used as the common electrode of the Cst. Compared with the storage on common method, the TFT-LCD of the storage-on-gate method, which does not have the separate wiring for the Cst, has a larger aperture ratio and there is no overlapped portion between data lines and the Cst wiring, and thereby opens in the data lines are reduced and the recovery rate is increased. However, because the Cst which is formed on the gate wiring makes a signal delay of the gate line, the gate wiring must be made of low resistance metal, such as aluminum (Al) or aluminum alloy (Al alloy). Moreover, based on an electric charge of a pixel, because it is not a perfect dot inversion or column inversion, picture quality is relatively lowered.

Hereinafter, referring to the drawings, a conventional liquid crystal display will be described in detail.

FIG. 1 is a plan view showing a unit pixel area of a TFT-LCD of the storage on gate type.

As shown in FIG. 1, two data lines 11 are aligned parallel to each other, and two scanning lines or gate lines 12 are aligned parallel to each other in a perpendicular direction to the data lines. Furthermore, TFTs, including source/drain electrodes 13 and 14 and a gate electrode 15, is formed at intersections of the data lines and the gate lines 12. At the center portion of the pixel area is formed a pixel electrode 16 electrically connected with the drain electrode 14. A Cst 17 is formed on an upper end of the pixel area using a portion of the gate wiring as an electrode. The Cst 17 helps to charge a signal voltage.

FIG. 2 is a plan view of the conventional liquid crystal display.

In general, liquid crystal display panel includes a plurality of scanning lines or gate lines 21 (GØ–Gn) aligned in one direction and in regular intervals, a plurality of data lines 22 (D1–Dn) aligned in a perpendicular direction to the gate lines and in regular intervals, a plurality of pixel electrodes (not shown) defined by the gate lines and the data lines, and a plurality of switching devices such as TFTs (not shown) switched by signals of the gate lines and applying data signals supplied through the data lines to the pixel electrodes.

Furthermore, driver ICs 23 and 24 for supplying gate driving signals and data signals are attached to a portion of the gate lines and the data lines. That is, a pad is formed at ends of the gate lines and the data lines, where the driving drive ICs will be connected.

FIG. 3 is a sectional view along line I–I' of FIG. 2.

First, in a TFT substrate, which is a lower substrate, a gate insulating film 32 is piled up on an insulating substrate 31. First and second data lines 33 and 34 are patterned on the gate insulating film 32. A passivation layer 35 of insulated material, is formed on the substrate including the data lines. Moreover, a pixel electrode 36 is patterned on the passivation layer 35 corresponding between the first and second data lines 33 and 34. A color filter substrate, which is an upper substrate, includes black matrixes 38 formed in regular intervals and a color filter layer 39 formed in a space between the black matrixes 38.

However, the conventional liquid crystal display and the manufacturing methods thereof have the following problems.

The final voltage applied to a pixel is fixed after a coupling phenomenon acts on it by the gate signal. That is, the difference between $V_{gh}$ and $V_{gl}$ is the size of a voltage applied to pixel. However, in the case of the number Ø gate line (the first gate line, GØ) (see FIG. 2), because only the $V_{gl}$ signal of the $V_{gh}$ and $V_{gl}$ signals, is applied there occurs a difference between the voltage applied to those pixels and the voltage applied to the pixels of another gate line, and thereby a light phenomenon occurs to pixels controlled by the number 1 gate line (G1).

Generally, as a counter measure of such a light phenomenon, there is a method to apply the same signal as a prescribed gate line to the number Ø gate line (GØ), but this requires an additional material cost.

SUMMARY OF THE INVENTION

It is, therefore, an object of the present invention, to provide a liquid crystal device capable of blocking a transmission of light and maintaining a luminosity of a liquid crystal display panel uniformly by forming an active layer of amorphous silicon (a-Si:H) material on a lower layer of pixels controlled by a number 1 scanning line or gate line (G1).

To achieve the above object, the present invention provides a liquid crystal display including: a plurality of scanning lines or gate lines (GØ–Gn) formed in a first direction; a plurality of data lines (D1–Dn) formed in a direction crossing the gate lines; a plurality of pixel electrodes formed in a pixel area defined by the gate lines and the data lines, the pixel electrodes indicating pictures by a control of the corresponding gate lines; and a light volume adjusting layer formed on a lower layer of the pixel electrodes controlled by a second gate line.

In another aspect, to achieve the above object, the present invention provides a method for manufacturing a liquid crystal display, the method including the steps of: forming gate lines and a gate electrode on an insulating board; forming a gate insulating film on the board including the gate electrode; forming a first active layer on the gate insulating film corresponding to an upper portion of the gate electrode and forming a second active layer on the gate insulating film corresponding to a portion where pixel electrodes are formed; forming source/drain electrodes on an upper portion of the first active layer; and forming a passivation film on the whole surface of the active layer including the source/drain electrodes.

Flicker, which is a twinkle phenomenon of panel picture, occurs when there is a difference between (+) and (−) voltages of data lines to voltage applied to a common electrode. To relieve a level of the flicker, a TFT-LCD structure may be changed and the difference between (+) and (−) voltages of the data lines may be compensated by enlarging a Cst volume. However, in the TFT-LCD structure of a storage on gate method, if the Cst volume is enlarged, there may occur unfavorable side effects on the number Ø gate line, to which only the $V_{gl}$ signal, of $V_{gh}$ and $V_{gl}$ signals, is applied, since the Cst is a portion of the gate line. For an example, the line light phenomenon occurs to pixel electrodes controlled by the number 1 gate line (G1).

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
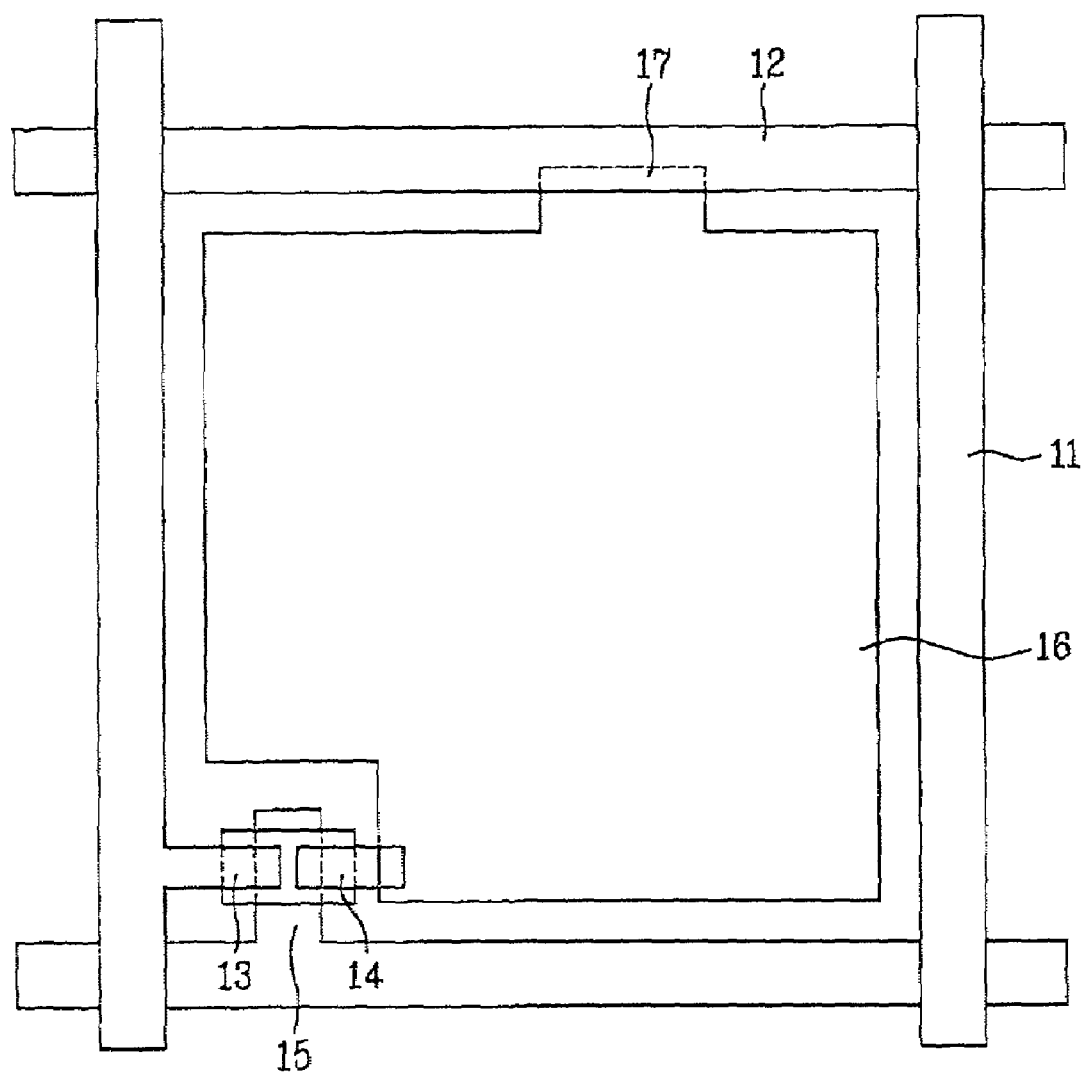
FIG. 1 is a plan view showing a unit pixel area of a conventional TFT-LCD of a storage on gate method.

The present invention will now be described in detail in connection with preferred embodiments with reference to the accompanying drawings. For reference, like reference characters designate corresponding parts throughout several views.

Figure 2:
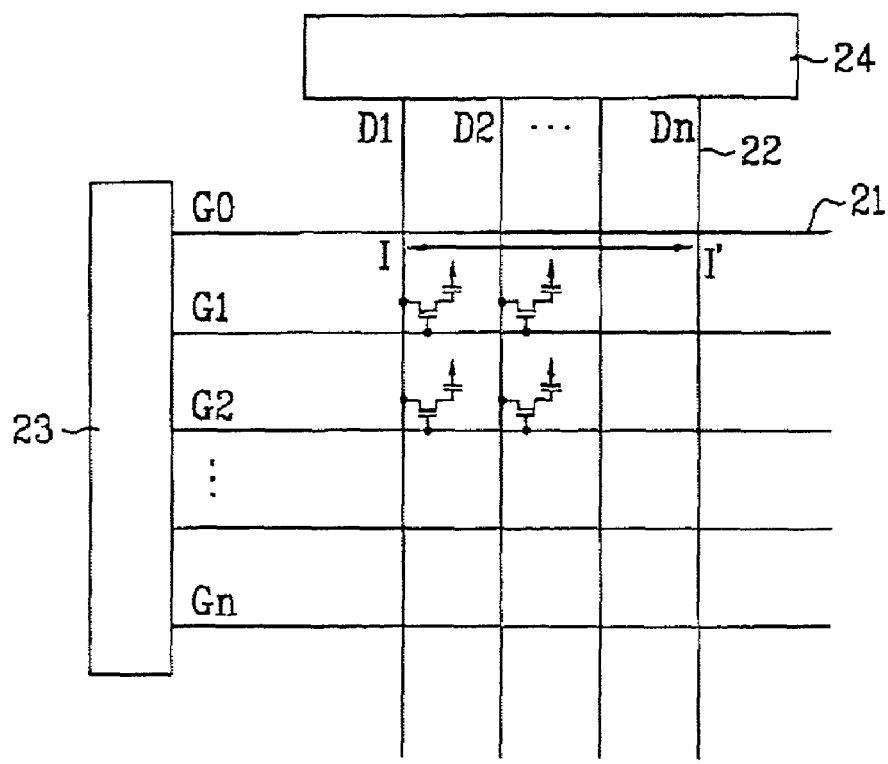
FIG. 2 is a plan view of a conventional liquid crystal display.
Figure 3:
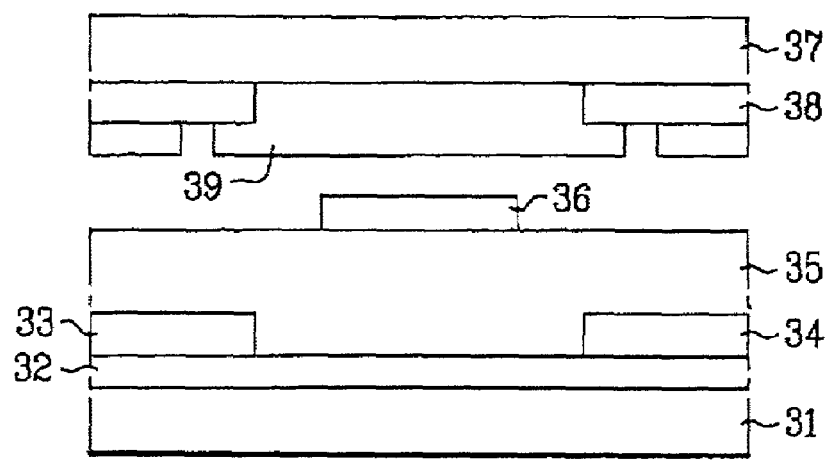
FIG. 3 is a sectional view of the liquid crystal display along the line of I–I' of FIG. 2.
Figure 4:
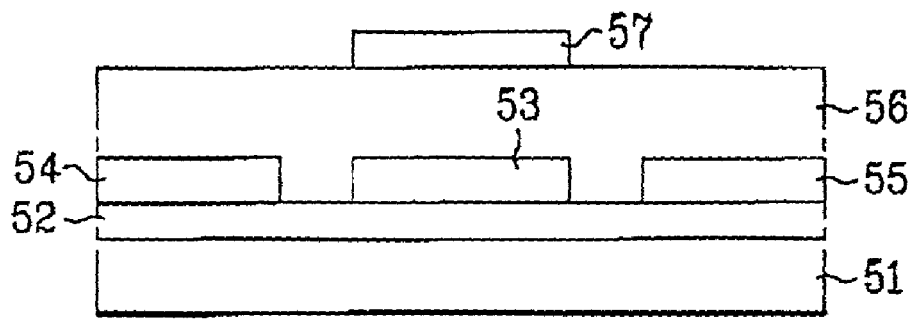
FIG. 4 is a sectional view of a liquid crystal display according to the present invention.

In the liquid crystal display described with respect to FIG. 4, an active layer of, e.g., amorphous silicon (a-Si:H) material, on a lower layer of pixels controlled by the number one scanning line or gate line (G1) (see FIG. 2) serves to restrict a transmission of light to pixel electrodes and to restrict the line light phenomenon. Accordingly, this active layer may also be referred to as a light transmission restricting layer.

Hereinafter, referring to the drawings, the liquid crystal display and its manufacturing method according to the present invention are described in detail.

FIG. 4 is a sectional view of the liquid crystal display according to the present invention and shows unit pixels of a plurality of pixel areas controlled by the number 1 gate line (G1).

An upper substrate, on which a color filter layer is formed, is the same as the related arts, and therefore, only a structure of a lower substrate, on which a TFT (Thin Film Transistor) is formed, will be described.

A gate insulating film 52 is formed on a substrate 51, a first active layer, which is a channel layer of the TFT, (not shown) is formed on the gate insulating film 52, and a light transmission restricting layer 53 is formed on the gate insulating film corresponding to a portion where the pixel electrodes are formed. Here, the first and second active layers are preferably made of amorphous silicon (a-Sh:H) material. First and second data lines 54 and 55 are patterned at right and left portions of the light transmission restricting layer 53, and a passivation layer 56 of insulating film material is formed on the substrate 51 including the data lines. A plurality of pixel electrodes 57 are patterned on the passivation layer 56 corresponding to the light transmission restricting layer 53.

The light transmission restricting layer 53 can change the thickness according to a transmission of light. When the active layer is patterned, the thickness of the light transmission restricting layer 53 can be changed by adjusting an etching speed during an etching process after a photolithography process. Moreover, also an area of the active layer can be adjusted using the photolithography process.

FIGS. 5a through 5d are sectional views for explaining a manufacturing method of the liquid crystal display according to the present invention. The upper substrate, on which the color filter is formed, is the same as the related art, and therefore, only the lower substrate will be described.

Figure 5A:
FIGS. 5a through 5d are sectional views for explaining a manufacturing method of the liquid crystal display according to the present invention.

As shown in FIG. 5a, the gate insulating film 52 is formed by evaporating an insulating material of silicon nitride $(SiN_x)$ on the substrate 51 using a PECVD (Plasma Enhanced Chemical Vapor Deposition) method.

Figure 5B:
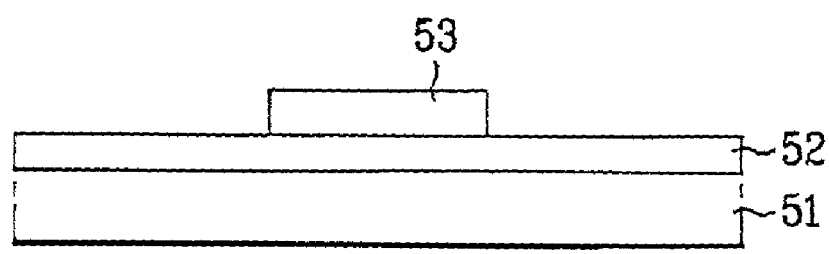

As shown in FIG. 5b, the light transmission restricting layer 53 of the amorphous silicon (a-Si:H) material is evaporated on the gate insulating film 52 using the PECVD method, and then patterned through a photolithography process, an etching process and a strip process. Beneficially, the light transmission restricting layer 53 is the same as the amorphous silicon layer, which is a channel layer of the TFT, and thereby the active layer is formed when the channel layer of the TFT is formed, without any additional process.

Figure 5C:
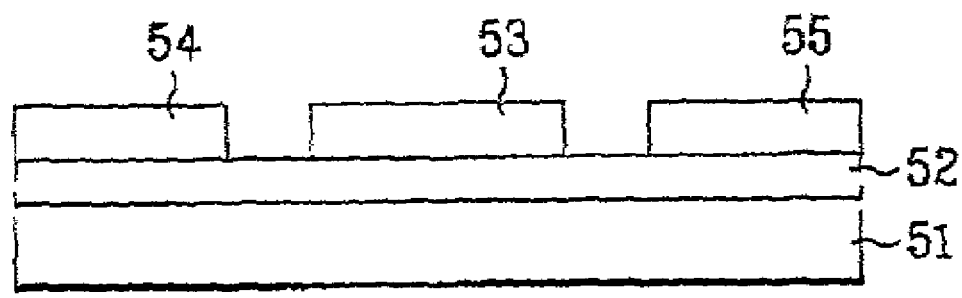

As shown in FIG. 5c, conductive metals disposed at both sides of the light transmission restricting layer 53 are evaporated using a sputtering method, and then, patterned to form data lines 54 and 55.

Figure 5D:
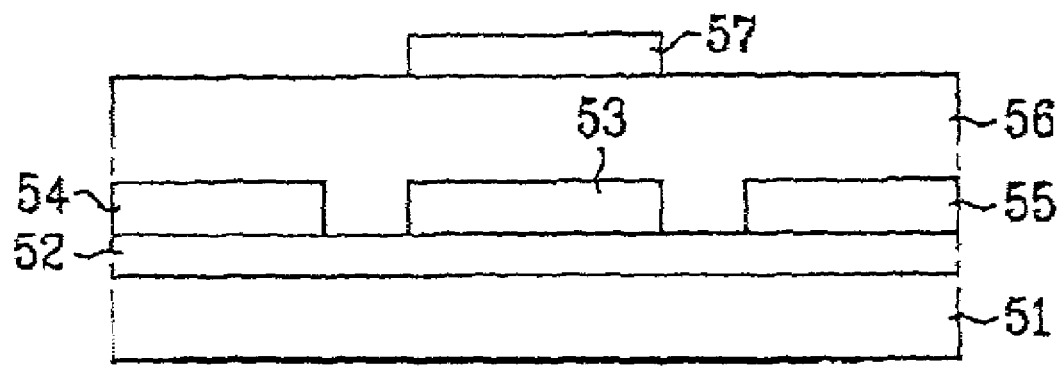

As shown in FIG. 5d, the passivation layer 56 of insulating material is formed on the whole surface of the substrate 51 including the light transmission restricting layer 53 and the data lines 54 and 55. A transparent conductive film of, e.g., Indium Tin Oxide (ITO) material, is evaporated on the passivation layer 56 corresponding to the active layer using the sputtering method, and then, patterned to form the pixel electrodes 57.

After that, it is not shown in the drawings, but if the substrate 51, on which the pixel electrode is formed, and the substrate, on which the color filter is formed, are cohered and liquid crystal is sealed, the manufacturing process of the liquid crystal display according to the present invention is finished.

As described above, the liquid crystal display and its manufacturing method according to the present invention have the following effects.

When the pixel electrode controlled by the number 1 gate line (G1) is formed, the light transmission restricting layer is formed on a lower layer of the pixel electrode to restrict the transmission of light, thereby preventing the light phenomenon of the number 1 gate line (G1) due to the number Ø gate line (GØ) (see FIG. 2), to which only $V_{gl}$ signal, of the $V_{gh}$ and $V_{gl}$ signals, is applied.

Furthermore, when the channel layer of the TFT is formed, the light transmission restricting layer is formed without requiring additional process, thereby changing the thickness and the area of the active layer through the existing process.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A liquid crystal display comprising:
   a plurality of gate lines including first and second to $n^{th}$ gate lines formed along a first direction, wherein n is an integer equal to or greater than 3;
   a plurality of data lines formed along a second direction substantially perpendicular to the first direction and crossing the gate lines;
   a plurality of pixel electrodes each formed in a pixel area defined by the gate lines and the data lines; and
   a light transmission restricting layer formed beneath at least one of the pixel electrodes positioned between the first and second gate lines and not formed beneath the pixel electrodes positioned between any other gate lines.

2. The liquid crystal display as claimed in claim 1, wherein the light transmission restricting layer is an amorphous silicon layer.

3. The liquid crystal display as claimed in claim 1, wherein the light transmission restricting layer is formed beneath a plurality of pixel electrodes that are controlled by a second gate line among the gate lines.

4. The display device as claimed in claim 1, further comprising:
   a plurality of switching devices adjacent to crossing portions of the gate and data lines, each switching device including an active layer, wherein each switching device is connected to one of the gate lines for controlling a switching of the switching device and one of the data lines for applying data to the switching device, wherein switching devices in each row are connected to a same gate line, and wherein the rows of switching devices are sequentially scanned by the gate lines.

5. The display device as claimed in claim 4, wherein the light transmission restricting layer is a semiconductor layer.

6. The display device as claimed in claim 4, wherein the semiconductor layer is same as the active layer of the switching device.

* * * * *